J. B. JEWELL.
Stove-Pipe Joint.

No. 219,098. Patented Sept. 2, 1879.

Witnesses:
W. F. Morsell
D. P. Cowl

Inventor:
John B. Jewell
per attys.
A. H. Evans & Co

UNITED STATES PATENT OFFICE.

JOHN B. JEWELL, OF CARROLLTON, MISSOURI.

IMPROVEMENT IN STOVE-PIPE JOINTS.

Specification forming part of Letters Patent No. 219,098, dated September 2, 1879; application filed February 1, 1879.

*To all whom it may concern:*

Be it known that I, JOHN B. JEWELL, of Carrollton, Missouri, have invented a new and useful Improvement in Stove-Pipe Joints, of which the following is a clear, full, and exact description, reference being had to the accompanying drawings, making a part of this specification, in which—

Figure 1:
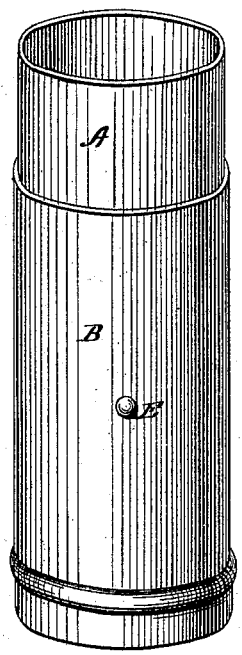
Figure 2:
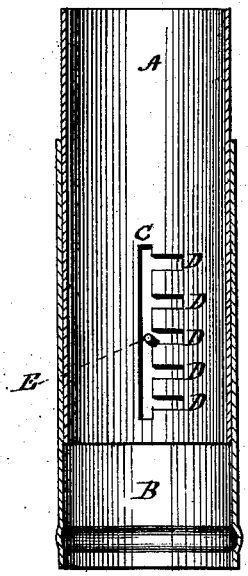
Figure 3:
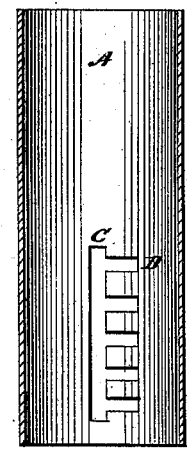

Figure 1 represents a side elevation of two sections of my improved pipe. Fig. 2 is a vertical section of the same. Fig. 3 is a separate view of the slotted section.

My invention relates to stove-pipes which are designed to be adjustable in length; and it consists in the sections constructed as hereinafter described and claimed.

To enable others skilled in the art to make and use my invention, I will proceed to describe the exact manner in which I have carried it out.

In the drawings, A B represent two sections of a stove-pipe. In the section A, which fits snugly in the section B, I make the longitudinal slot C, of a length equal to the range of adjustment desired. At right angles to the slot C, I make a series of short slots, D, as shown in Fig. 3.

Through the side of the section B, I secure the pin E, fitting loosely in the slots C D, and extending inside the section B, and passing through the slots in section A. By this means are secured together the two sections, which are adjustable in length, by sliding out the section A any desired length, and then locking it in position by passing one of the transverse slots D around the pin E.

It is evident that to vary the length of the pipe it is only necessary to revolve one section of the pipe until the pin has left the transverse slot and entered the longitudinal slot C, when the pipe is free to be lengthened or shortened at will; and when properly adjusted, by another partial revolution of either portion of the pipe, the pipe E enters one of the short slots, and the two sections are again locked together.

I am aware that inwardly-projecting pins have been used in stove-thimbles, and therefore I do not claim such pins, broadly.

I am also aware that it is not new to make longitudinal and transverse slots in stove-pipes; nor is it new to make stove-pipes with vertically-adjustable section. Such, broadly, I do not claim as my invention.

Having thus described my invention, what I claim as new, and desire to secure by Letters Patent, is—

An adjustable stove-pipe, constructed as described, and consisting of the section A, provided with the longitudinal slot C and a series of transverse slots, D, in combination with the section B, provided with the internal pin, E, substantially as described.

JOHN BARNET JEWELL.

Witnesses:
O. J. KERBY,
DAN R. BRAND.